350-319.    XR    3556038    SR

United States Patent

[11] 3,556,038

| [72] | Inventor | Russell C. Wolfe<br>6317 La Grange Lane, Baltimore, Md. 21212 |
|---|---|---|
| [21] | Appl. No. | 810,228 |
| [22] | Filed | Mar. 25, 1969 |
| [45] | Patented | Jan. 19, 1971 |

[54] VIEW PORT MOUNTING FRAME AND METHOD OF MAKING SAME
14 Claims, 11 Drawing Figs.

[52] U.S. Cl. .................................................. 114/173,
                                  220/82, 350/319
[51] Int. Cl. ................................................... B63b 19/08
[50] Field of Search ........................................... 114/173;
                      49/171; 350/319, 179; 220/82, 82A

[56] References Cited
UNITED STATES PATENTS

| 1,189,922 | 7/1916 | Daly ............................ | 220/82 |
| 3,407,662 | 10/1968 | Tarbox ........................ | 220/82UX |

*Primary Examiner*—Andrew H. Farrell
*Attorney*—Lawrence J. Winter

ABSTRACT: A transparent view port mounting frame for a vessel comprising an annular mounting ring with means for securing it to an opening in a vessel or hull and separable conical ring members disposed within said annular ring with sealing means for providing a fluidtight seal between the conical rings and the mounting ring, and transparent window means seated on said conical rings with clamp ring means secured to said mounting ring to properly secure said conical rings and said window means as an integral unit.

PATENTED JAN 19 1971    3,556,038
SHEET 1 OF 2
Fig. 1
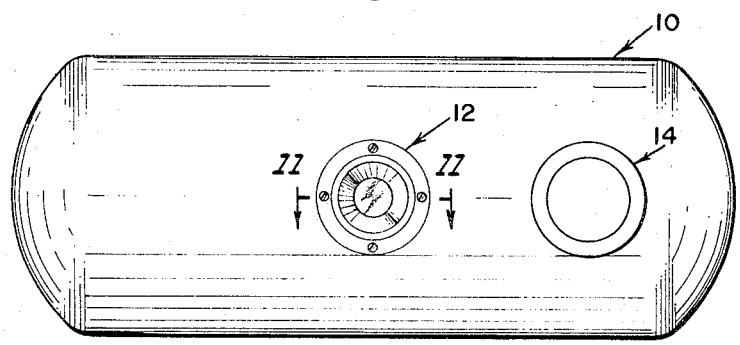
Fig. 2
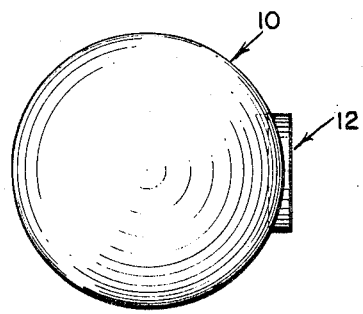
Fig. 3
START WITH METAL
BLANK
MILL CONICAL SEAT WITH LATHE OR
THE LIKE
Fig. 4
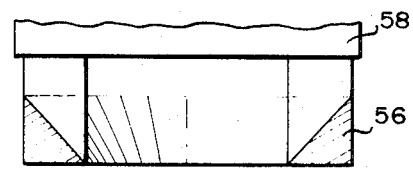
MILL O RING GROOVE AND CENTRAL
APERATURE AND REPEAT PROCESS
FOR SECOND RING
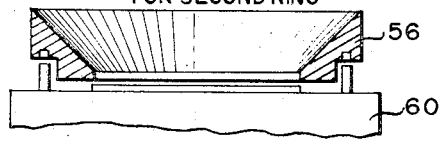
Fig. 5
INVENTOR
Russell Wolfe
BY Lawrence J. Winter
ATTORNEY

MILL APERATURE IN HULL

WELD VIEWPORT MOUNTING IN HULL APERATURE

INSERT O-RINGS AND CONICAL SEATS INTO MOUNTING RING

INSERT O-RINGS AND VIEWPORTS IN ASSEMBLY OF FIGURE 8

ADD CLAMP RINGS TO COMPLETE ASSEMBLY

INVENTOR
Russell Wolfe

VIEW PORT MOUNTING FRAME AND METHOD OF MAKING SAME

A method of mounting a view port in a vessel or hull including the steps of providing an annular mounting ring with means for securing the ring to an aperture in a hull or a vessel, said mounting ring being such a dimension that it can be machined on a conventional lathe. Machining at least two conically shaped seating rings and providing sealing grooves therein and making said conical rings of such a configuration so that they seat against the inner surface of said mounting ring. Inserting the conical rings in a fluid tight relationship with the mounting ring and thereafter inserting transparent window means within said mounting ring and adjacent said conical surface of said conical rings and mounting clamp rings adjacent the outer sides of said mounting ring so as to hold said conical rings and window means in a fixed position relative to each other and to said mounting ring, and securing the mounting ring in an opening in a vessel.

The present invention relates to a mounting frame for holding the view port or window means in a vessel or hull, and a method of machining the parts and securing them together so that they may be placed in an opening in a submersible vessel.

It is an object of the present invention to provide a plastic or transparent view port mounting frame that can be readily made on conventional lathes or machines and thereafter assembled in an aperture or an opening in a large vessel such as a hull or a submersible vessel of unusually large dimensions.

It is another object of the present invention to provide a view port mounting frame comprising an annular ring member with a substantially right angled seat for receiving a plurality of seating rings having a conical surface therein, which rings are made separately from the mounting rings on conventional machines and which are later secured to the mounting frame so that the mounting frame and the seating rings may be secured in an opening of a large vessel such as a submersible vessel without requiring the entire vessel to be placed upon a huge machine and have its surfaces turned to provide a conical seating ring surface or other unusual surfaces.

It is yet another object of the present invention to provide a view port mounting frame with a plurality of assembled parts, which parts are all made separately from a hull or large vessel to which they are later secured to thus eliminate the necessity of placing the entire vessel or hull upon a huge machine in order to properly turn or provide the conical configurations or other surfaces necessary to permit the parts to mate.

Yet another object of the present invention is to provide a vessel having conical seated view ports in which these seats are not machined into the hull of a vessel, such as a large submersible vessel, so as to eliminate the expensive procedure followed heretofore.

It is a further object of the present invention to provide a view port for a hull of a vessel and the like, having separate conical seat rings which conical seat rings are seated against a simple annular ring with a flat surface and which annular ring and conical seat rings are separately machined and thereafter assembled together and the entire arrangement is then secured in an opening in the vessel, such as by welding and the like, so that the individual component parts can be machined in any conventional equipment since they are small parts and eliminate the necessity of requiring the entire large vessel to be set upon a huge machine and turning the view ports and the necessary seating surfaces in such a manner.

Various other objects and advantages of the present invention will be readily apparent from the following detail description when considered in connection with the accompanying drawings, forming a part thereof and in which:

FIG. 1 is a view of a hull of a large vessel with the view port mounting frame of the present invention embodied therein;

FIG. 2 is an end view of the hull of the vessel shown in FIG. 1;

FIG. 3 illustrates a metal blank from which one of the conical seat rings is machined;

FIG. 4 illustrates a step of milling or machining a conical seat configuration from a conventional lathe or the like to provide a conical seat ring embodied in the present invention;

FIG. 5 illustrates another step of machining an O-ring groove and central aperture for the conical seat rings embodied in the present invention;

Figure 6:
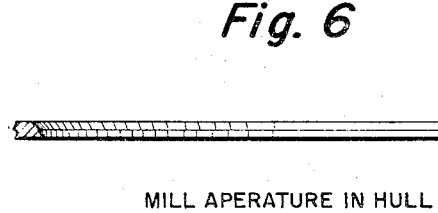
FIG. 6 illustrates the step of machining or milling an aperture or an opening in the hull of the vessel.

Referring to the drawings, the reference numeral 10 generally designates a hull or a vessel such as a submersible vessel which may be used in oceanography or diving operations and the like. As can be seen from FIGS. 1 and 2, the vessel is of elongated cylindrical configuration and is of a relatively large size so that it may be entered into by divers or personnel. The vessel may have any desired number of view ports or view ports 12 and manholes or hatches 14 for entry into it.

Figure 10:
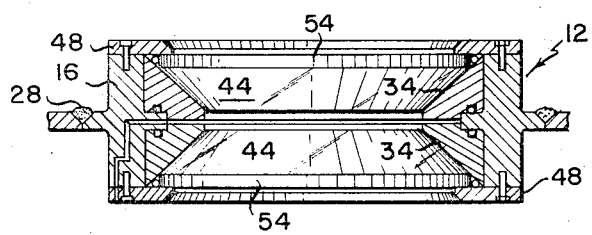
FIG. 10 illustrates the step of adding or securing the clamp rings to the complete assembly of the view port to properly secure the component parts in a fixed relationship.
Figure 11:
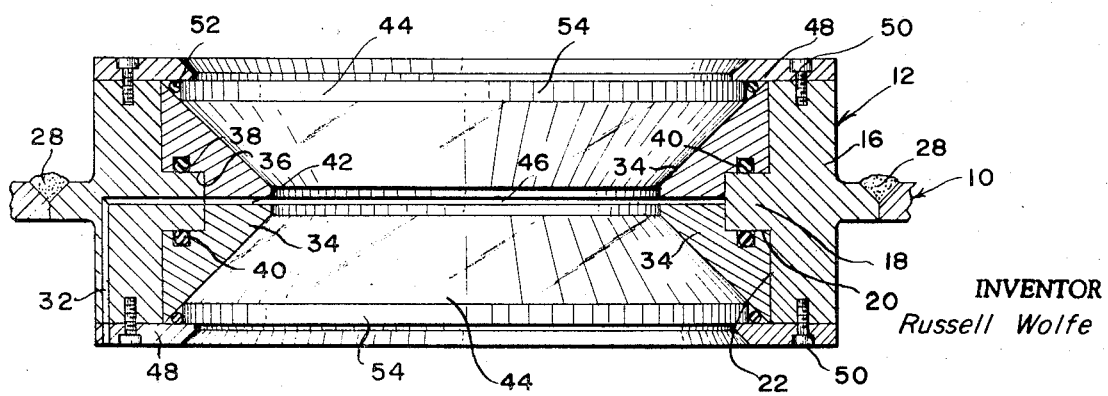
FIG. 11 is an enlarged sectional view taken along the lines of 11–11 of FIG. 1, illustrating the completed view port disposed in the hull or the vessel.

In making the view port mounting frame of the present invention, an annular ring 16, as shown in FIG. 7 to 11 is machined on any conventional machinery. The diameter of the ring 16 can vary in size, though it is preferably between one foot and two feet in diameter, or in other words of a relatively small dimension when compared with the cylindrical diameter and the overall size or dimension of the vessel 10. The ring 16 is machined so that it has an inwardly extending annular rim 18 with the inner surface 20 of the ring, forming a substantially right angle with the opposite surfaces 22 of the inner annular rim 18. The outer surface 24 of the mounting ring 16 is provided with an outwardly extending annular flange or rim 26 for securing the ring to the vessel 10 by welding as indicated at 28. The ring 16 is further provided with a plurality of circumferentially spaced threaded bolt openings 30 therein, and also has a drilled passage 32 therein. The drilled passage 32 extends from one of the outer faces of the mounting ring 16 to the inner surface or face of the annular rim 18 as best is seen in FIG. 11. The purpose of the drilled passage 32 is to permit the interior of the view port to be filled with optical oil as hereinafter described.

interior of the mounting ring 16 is provided with two oppositely disposed conical seat rings 34. The conical seat rings have a triangular configuration with a cutout section 36 opposite the conical section with the cutout portion permitting the rings 34 to seat on the annular rim 18, as best seen in FIG. 11. The cutout sections are further provided with a groove 38 therein, to receive a continuous O-ring 40 therein. The two separate rings 34 are spaced from each other so as to provide a central space 42 therebetween, which space is in communication with the drilled passage 32 in order to receive optical liquid therein. The conical surfaces of the rings 34 are adapted to permit a transparent port 44 to seat thereagainst. The port 44 of one of the rings 34 is spaced from coaxial port 44 so that the space 46 between the inner facing surfaces of the ports can receive optical fluid therebetween. The transparent ports 44 are held against the conical surfaces of the rings 34 by the annular clamping rings 48, secured to the mounting ring 16 by a plurality of bolt members 50 threaded into the threaded openings 30. An O-ring 52 is disposed between the inner portion of the clamp ring 48 and the conical surface of the rings 34 and the straight surface 54 of the port 44 to provide a fluid-tight seal therebetween.

In making the view port assembly of the present invention, and securing it in the aperture in the hull or vessel 10, an opening or aperture, as best seen in FIG. 6, is milled into the hull or cut in the side of the hull. The hull is then ready to receive the view port assembly when it has been made and secured together into the arrangement shown in FIG. 11. In making the view port assembly, a metal blank 56 shown in FIG. 3, has a conical configuration or conical seat milled into it with a small lathe by a tool 58, illustrated in FIG. 4. The blank is then milled with a tool 60, as shown in FIG. 5, to provide an O-ring groove and a central aperture in the blank. The steps of the process, illustrated in FIGS. 3, 4, and 5, are repeated to provide a second ring from another metal blank identical to the first ring.

Figure 7:
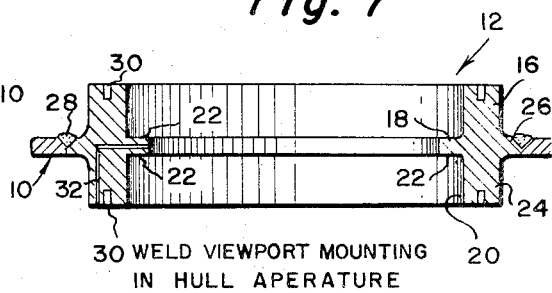
FIG. 7 illustrates the step of welding the mounting ring frame in the hull aperture.
Figure 8:
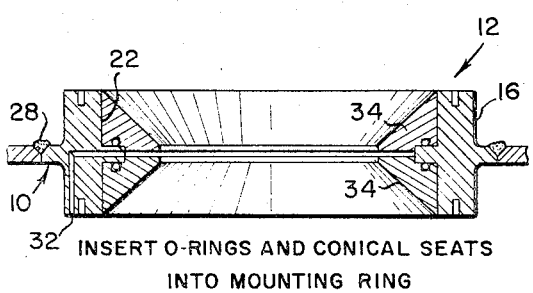
FIG. 8 illustrates the step of inserting the O-rings and the conical seat rings into the mounting ring frame.
Figure 9:
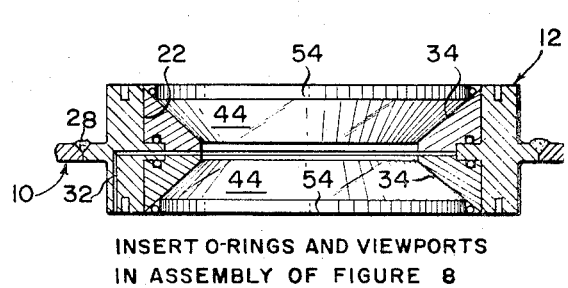
FIG. 9 illustrates the step of insertion of the O-rings and the plastic view ports to the conical seat rings illustrated in FIG. 8.

The mounting ring 16 is also made on a small lathe and machined to provide the simple annular ring structure with the flat surface therein. Thereafter the ring 16 is welded, as best seen in FIG. 7, to the aperture provided in the hull 10. Thereafter the O-rings are inserted into their grooves in the conical seat rings 34 and the conical seat rings are mounted into the mounting ring 16, as best seen in FIG. 8. Next, the transparent ports 44 are inserted within the structure, so as to be seated upon the conical surfaces of the conical seat rings and the O-rings for the ports are properly positioned so that the surfaces bear against each other in a fluidtight manner.

When this step has been completed, the clamp rings 48 are bolted to the structure as to rigidly clamp and fix all of the component parts together, as best seen in FIGS. 10 and 11.

Thus, from the foregoing description, it is apparent that the present invention provides a simple method of machining and inserting a view port into a hull or a vessel or a large chamber without requiring the conical seated view ports to be machined into the hull of a vessel, as done heretofore. The present invention provides a mounting which eliminates this prior method by making the conical seat a separable item. The present invention further provides the arrangement wherein a very simple annular ring with a flat surface can be welded into the large vessel or hull, and provides the necessary support for the conical ring. Thus, with this invention, all of the component parts of the finished structure or assembly are made from relatively small parts, when compared to the hull or vessel or the large cylinder into which they are finally secured, so that these small parts can be machined in any good lathe, and thus eliminates the necessity of setting the entire submersible vessel or hull upon a huge machine, so as to turn the view ports and the conical configurations into the hull.

Inasmuch as changes may be made in the form, location and relative arrangement of several parts without departing from the essential characteristics of the invention, and it is to be understood that this invention is not to be limited except by the scope of the appended claims:

I claim:

1. A method of providing a view port having conical seating surfaces for a large hull without rotating the hull on a machine comprising the steps of forming separately an annular mounting ring with a flat surface, forming separate conical seating rings with a conical surface and with flat surfaces adapted to seat against complementary surfaces on said mounting ring, forming separate plastic view ports with surfaces adapted to seat against said conical surface, forming separate clamping rings adapted to hold said conical rings and said view ports assembled in a fixed relationship within said mounting ring, disposing said conical rings and said view ports in said mounting ring and clamping them together, and securing said mounting ring in an aperture in said hull.

2. The method of claim 1 wherein said mounting ring is secured to said hull by welding the outer portion of the mounting ring thereon.

3. The method of claim 2 wherein said conical rings are formed with a cutout section adjacent their outer periphery and said conical surface is formed opposite said cutout section.

4. The method of claim 3 wherein the mounting ring is formed with a cylindrical inner surface and an inwardly projecting annular rim and is formed with a cylindrical outer surface with an outwardly projecting flange.

5. The method of claim 4 wherein the mounting ring is welded to the hull along its outwardly projecting flange, and said conical seating rings have their cutout sections seated against said mounting ring inwardly projecting rim.

6. A view port mounting frame for insertion into a large submersible hull and the like, comprising an annular mounting ring, a pair of conical seat rings with conical surfaces disposed within said ring and spaced from each other, a pair of transparent view ports seated on said conical surfaces and disposed within said mounting ring, and a pair of annular clamp rings secured to said mounting ring and clamping together said conical rings and view ports in a fixed relationship within said mounting ring.

7. The view port mounting frame of claim 6 wherein said mounting ring has an annular flange on its outer surface on an annular rim with flat surfaces on its inner surface, and a drilled passageway extending from one of its end surfaces through said annular rim.

8. The view port mounting frame of claim 7 wherein each of said conical seat rings has a substantially triangular cross section with a cutout portion adjacent its apex bearing against said annular rim of the mounting ring and with its side opposite said cutout portion forming a conical seat.

9. The view port mounting frame of claim 8 wherein each of said transparent ports has a circular configuration and is provided with a beveled circumferential surface seated against said conical seat of an adjacent conical ring.

10. The view port mounting frame of claim 9 wherein there are two conical rings mounted within said mounting ring, each seated on the opposite sides of said annular rim and facing in opposite directions so their respective conical seats are disposed away from each other.

11. The view port mounting frame of claim 10 wherein said conical rings have a portion extending radially inwardly of said annular rim and said rings are spaced from each other.

12. The view port mounting frame of claim 11 wherein said clamp rings are flat annular rings secured to the opposite end faces of said mounting ring and extend radially inwardly of said end faces.

13. The view port mounting frame of claim 12 wherein sealing means are disposed between said conical rings and said annular rim, and other sealing means are disposed between said clamp rings and conical rings to provide water tight seals therebetween.

14. The view port mounting frame of claim 13 including a large hull with a circular opening therein wherein said annular mounting ring is secured to the periphery of said opening by a continuous weld along said annular flange.